Aug. 21, 1956  J. E. KLEBOE ET AL  2,759,594
TENSIONING MEANS FOR CABLE CONVEYOR
Filed Jan. 17, 1955  2 Sheets-Sheet 1
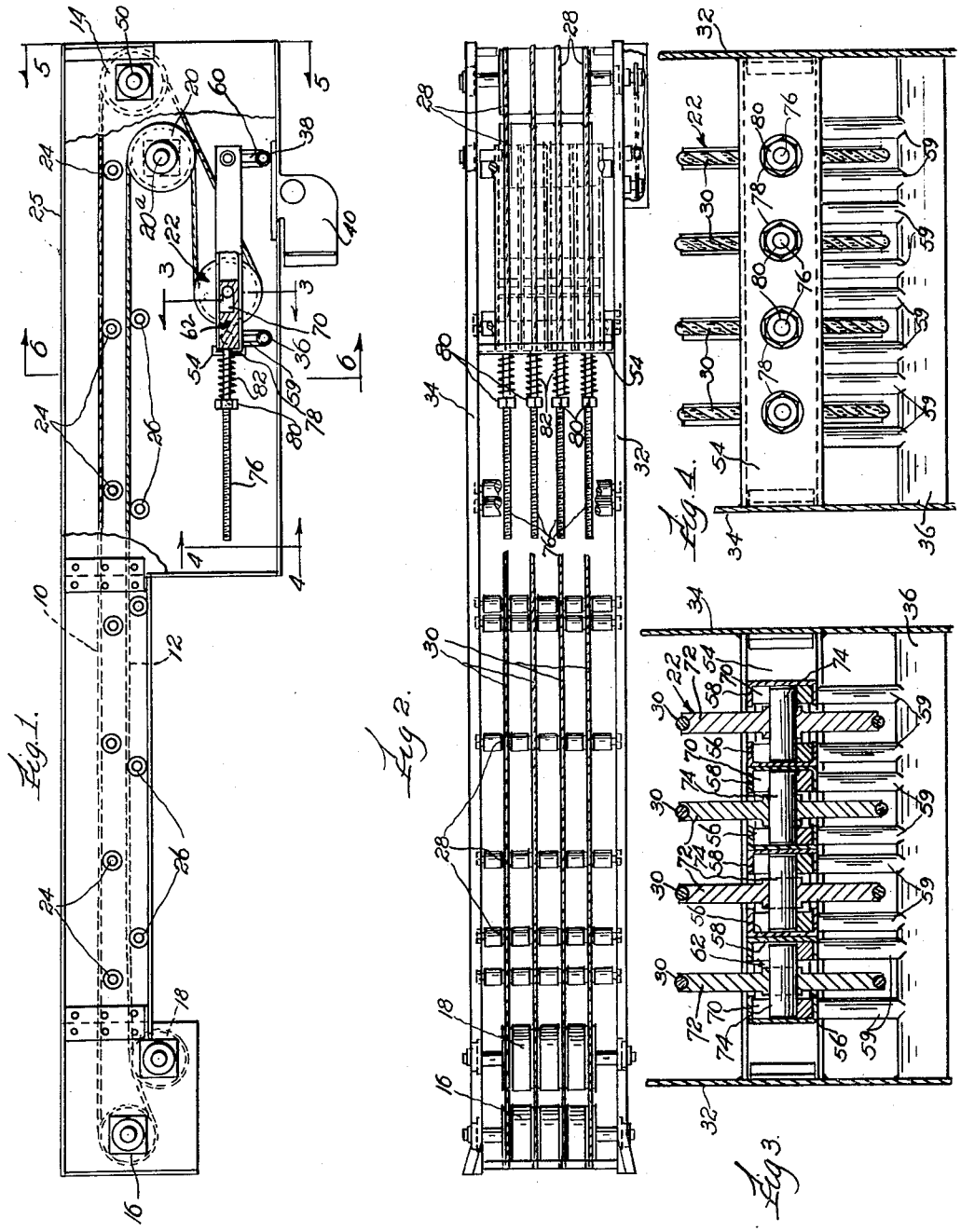
INVENTORS.
John E. Kleboe.
Harvey R. Krieger.
Wallace W. Wittenberger
by Bair, Freeman & Molinare
Attorneys.

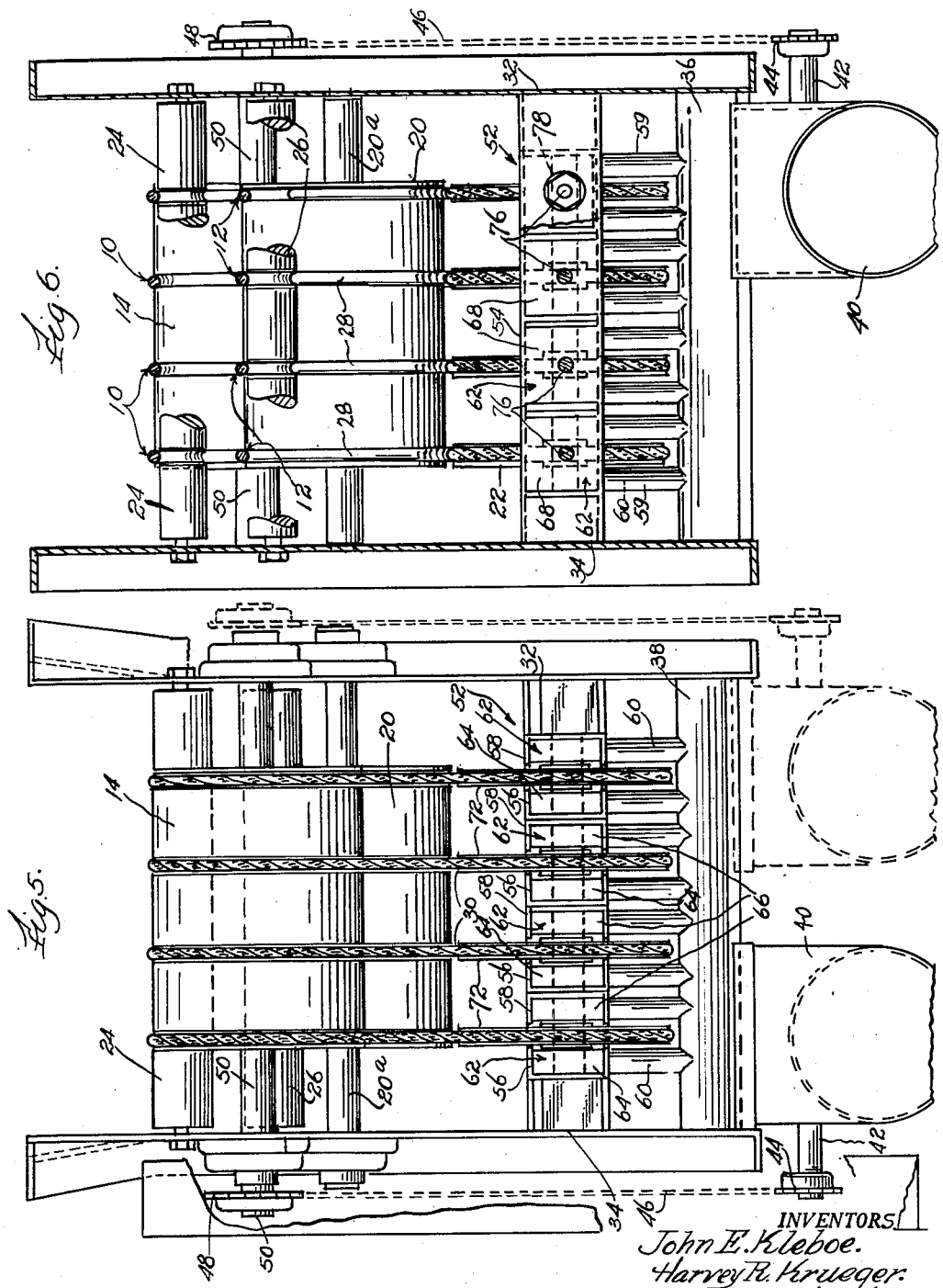

# 2,759,594

TENSIONING MEANS FOR CABLE CONVEYOR

John E. Kleboe, Chicago, Harvey R. Krueger, River Grove, and Wallace W. Wittenberger, Elmhurst, Ill., assignors to The Petersen Oven Company, Franklin Park, Ill., a corporation of Illinois Application January 17, 1955, Serial No. 482,243

2 Claims. (Cl. 198—190)

This invention relates to a conveyor for foodstuffs, such as bread and the like, and more particularly to a conveyor wherein the supporting run thereof is formed by spaced cables.

Foraminous conveyors for carrying foodstuffs, such as bread and the like, have been used heretofore. However, such conveyors have been so constructed that damage to a portion of the conveyor may necessitate removal of the entire conveyor or replacement of a section of the conveyor which extends transversely across the entire width of conveyor.

One object of this invention is to provide a novel and improved cable conveyor for foodstuffs, such as bread and the like, which is provided with means for maintaining each of the cables under proper tension so that the load that is carried thereby is properly distributed and so as to accommodate cables of varying lengths.

Another object of this invention is to provide an improved cable conveyor that is characterized by its simplicity and inexpensiveness of construction and assembly, and its efficiency and reliability in operation.

A further object is to provide a foraminous conveyor for foodstuffs and the like that is very sanitary and very easy to keep clean.

Still another object of this invention is to provide a cable conveyor for foodstuffs and the like which, if a cable of the conveyor becomes damaged, permits installation of another cable, simply and easily, without necessitating complete removal of the other cables of the conveyor.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a side elevation view of the cable conveyor of this invention;

Fig. 2 is a top plan view of the machine shown in Fig. 1;

Fig. 3 is a view taken on line 3—3, of Fig. 1;

Fig. 4 is a view taken on line 4—4, of Fig. 1;

Fig. 5 is an enlarged view taken on line 5—5, of Fig. 1; and

Fig. 6 is an enlarged view taken on line 6—6, of Fig. 1.

Referring now to the drawings there is shown in Fig. 1 an endless conveyor having an upper load carrying run 10 and a return run 12. The load carrying run 10 is defined at one end thereof by a drive roller 14 of relatively large diameter, and at the discharge end of said load carrying run by an end roller 16 which is also of rather large diameter.

The return run 12 of the conveyor leaves the large diameter roller 16 and thereafter passes somewhat upwardly and then over a large diameter roller 18 and then runs substantially parallel to the load carrying run 10 to a large diameter idling roller 20. The return run 12 passes around the idler roller 20 over an arc of substantially 180°, and is then trained over a take-up roller or sheave 22, and from there returns to the drive roller 14, thus completing the endless conveyor. Intermediate the large diameter rollers 14 and 16 are a plurality of spaced support rollers 24 of relatively small diameter for supporting the load carrying run of the conveyor. Also intermediate the rollers 18 and 20 are a plurality of spaced support rollers 26 which are of relatively small diameter and are provided for supporting the return run of the conveyor.

The large diameter rollers 14, 16, 18 and 20, and the small diameter rollers 24 and 26 are formed with circumferential grooves 28 in the periphery thereof, which grooves are substantially semi-circular in cross section and are of such a depth relative to the size of the cables as to accommodate the cables of the conveyor so that the cables of the conveyor appear to be flush with the cylindrical surface of the rollers as they pass over the rollers.

The conveyor itself is an endless body and is composed, in this particular instance, of four cables 30 formed of stranded steel or the like. The entire conveyor is mounted on a rigid frame means which includes side walls 32 and 34 and cross stiffener members 36 and 38.

The endless conveyor may be driven in any appropriate manner, but preferably the entire structure shown is supplied as a unit and carries its own drive means. The drive means shown includes a motor 40 which is appropriately attached to the frame means of the conveyor and which is operative through a drive shaft 42 and a sprocket 44 carried thereby to drive a chain 46 trained thereover. The chain 46, in turn, drives a sprocket 48 that is carried by a shaft 50 upon which the drive roller 14 is mounted. In the particular embodiment disclosed herein, the drive motor 40 and the sprockets 42 and 48 and chains 46 are located as shown in full lines in Fig. 5. However, if more convenient, said drive means may be mounted on the opposite side of the frame means, as shown in dot-dash lines in Fig. 5.

Referring now to the tensioning means or take-up roller means, a separate take-up roller, or sheave, is provided for each cable 30. Each take-up roller means or tensioning means comprises the same mechanism. As shown in the figures, there is mounted on the cross stiffener members 36 and 38 a sub-frame generally indicated at 52. The sub-frame 52 includes a cross-member 54 which extends between and is rigidly secured to the walls 32 and 34. The sub-frame also includes a plurality of pairs of elongated, opposite-facing and spaced channels, or guideways, 56—58 which are shown appropriately mounted by struts 59 and 60 on the cross-members 36 and 38.

Associated with each pair of spaced guideways 56 and 58 is a generally U-shaped member 62. Said U-shaped member defines a pair of spaced legs 64 and 66, and a bight 68. Legs 64 and 66 are positioned respectively in channels 56 and 58 and the U-shaped member is adapted to slide longitudinally along said guideways.

Each leg 64 and 66 is formed to define therein an L-shaped, or angle-shaped, slot or recess 70 which opens through the upper edge of the leg, as is most clearly seen in Fig. 1. A sheave, or take-up roller, 72, about which a cable 30 is trained, is mounted on a shaft 74, the ends of said shaft being journaled within the angle-shaped recesses 70 in a pair of legs of the U-shaped member 62. The shaft 74 is positioned in the horizontal leg of the recess 70, and the other leg of the recess 70 provides for entrance and removal of the shaft 74 into and from the recesses 70.

An elongated threaded stem 76 extends from the bight 68 of each U-shaped member 62 and extends therefrom through an aperture 78 in the frame cross-member 54.

An adjustable stop member or nut 80 is threaded on each said threaded stem 76 and is adapted for movement axially along said stem. A coil spring 82 surrounds said stem and is positioned between said adjustable stop 80 and the cross member 54. By adjusting the stop member 80 toward and away from the cross-member 54, the restoring force of the coil spring 82 may be varied, thereby providing means for varying the tension that is applied to a cable 30 that is trained over the sheave 72 which is carried by and moves with the U-shaped member 62.

It will be seen that by the above described mechanism, there is provided a cable type endless conveyor wherein each of the cables may be individually tensioned, thereby providing means for accommodating cables of slightly different lengths and for accommodating the cables as they stretch at various rates during their use.

Additionally, it will be seen that the above disclosed machine permits of the substitution of a new cable for a damaged cable without the necessity of completely dismantling the machine. In substituting a new cable, it is merely necessary to remove the sheave 72, over which the new cable is to be trained, from its journal bearings in U-shaped member 62 and then by looping the endless cable over the ends of the various other rollers 14, 16, 18, 24 and 26, there will remain a loop within which the sheave 72 may be inserted so as to train the new cable over all of the rollers. Thereafter, the sheave 72 may be reinserted into its journal supports in member 62 and the new cable has been installed.

Where the new cable to be installed is an inner one, it is necessary to loosen the adjacent outer cables, so that the new cable may be slipped under the existing outer cables to its proper position. However, the installation of a new inner cable, still requires only the removal of the single sheave 72, over which the new cable is to be trained, from its journal bearing and accordingly it can be seen that this invention provides for the easy and simplified installation of new cables without dismantling the entire conveyor.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. An endless conveyor for foodstuffs such as bread and the like comprising a plurality of spaced endless cables lying in a plurality of upright planes, said cables being trained over a plurality of spaced rollers which delineate a load-carrying run of the conveyor and a portion of the return run of the conveyor, means operatively associated with one of said spaced rollers for driving said roller and the cable conveyor trained thereover, and a plurality of take-up roller means each operatively associated with one of said cables in the return run of said cable for tensioning said cable, each said take-up roller means comprising a pair of elongated, parallel spaced guideways, a generally U-shaped member slidably mounted in said pair of guideways with the spaced legs of the U positioned one in each said guideway, each leg of the U having an angle-spaced slot therein, a sheave between the legs of the U journaled in said legs on a shaft whose ends are positioned in said angle-shaped slots, a threaded stem extending from the bight of the U, an adjustable stop threaded on said stem, an abutment spaced from said stop, and a coil spring surrounding said stem between said stop and said abutment for biasing said U-shaped member and said sheave carried thereby in a direction for tensioning the cable trained over said sheave.

2. An endless conveyor for foodstuffs such as bread and the like comprising a plurality of spaced endless cables lying in a plurality of upright planes, said cables being trained over a plurality of spaced rollers which delineate a load-carrying run of the conveyor and a portion of the return run of the conveyor, means operatively associated with one of said spaced rollers for driving said roller and the cable conveyor trained thereover, a plurality of take-up roller means each operatively associated with one of said cables in the return run of said cable for tensioning said cable, each said take-up roller means comprising a pair of elongated, parallel spaced guideways, a generally U-shaped member slidably mounted in said pair of guideways with the spaced legs of the U positioned one in each said guideway, each leg of the U having an angle-shaped slot therein, a sheave between the legs of the U journaled in said legs on a shaft whose ends are positioned in said angle-shaped slots, thereby providing means for selectively removing said sheave from its journal support, a threaded stem extending from the bight of the U, an adjustable stop threaded on said stem, an abutment spaced from said stop between said stop and said U-shaped member, and a coil spring surrounding said stem between said stop and said abutment for biasing said U-shaped member and sheave carried thereby in a direction for tensioning the cable that is trained over said sheave.

References Cited in the file of this patent

UNITED STATES PATENTS

| 659,771 | Stanley | Oct. 16, 1900 |
| 707,614 | McCabe | Aug. 26, 1902 |